(12) United States Patent
Doong et al.

(10) Patent No.: US 10,380,305 B1
(45) Date of Patent: Aug. 13, 2019

(54) DIRECT PROBING CHARACTERIZATION VEHICLE FOR TRANSISTOR, CAPACITOR AND RESISTOR TESTING

(71) Applicant: PDF Solutions, Inc., San Jose, CA (US)

(72) Inventors: Yih-Yuh Doong, Zhubei (TW); Sheng-Che Lin, Baoshan Township (TW); Chia-Chi Lin, Hsinchu (TW); Hans Eisenmann, Tutzing (DE); Cho-Si Huang, Baoshan Township (TW); Tzupin Shen, Hsinchu (TW); Christopher Hess, Belmont, CA (US); Kimon Michaels, Monte Sereno, CA (US)

(73) Assignee: PDF Solutions, Inc., San Jose, CA (US)

(*) Notice: Subject to any disclaimer, the term of this patent is extended or adjusted under 35 U.S.C. 154(b) by 0 days.

(21) Appl. No.: 15/273,545

(22) Filed: Sep. 22, 2016

Related U.S. Application Data

(60) Provisional application No. 62/222,128, filed on Sep. 22, 2015.

(51) Int. Cl.
    G06F 9/455 (2018.01)
    G06F 17/50 (2006.01)

(52) U.S. Cl.
    CPC ...... *G06F 17/5072* (2013.01); *G06F 17/5077* (2013.01); *G06F 17/5081* (2013.01); *G06F 2217/06* (2013.01); *G06F 2217/12* (2013.01)

(58) Field of Classification Search
    CPC ............ G06K 7/10198; G06K 19/073; G06K 9/6263; H04L 2209/84; G01R 31/31704; G01R 31/318314; G06F 17/5022; G06F 11/261; G06F 17/5045; G06F 13/4282; G06F 1/266; G06F 1/3225; G06F 12/1408; G06F 21/10; G06F 21/03; G06F 9/3001; G06F 9/3004; G06F 9/30065;
    (Continued)

(56) References Cited

U.S. PATENT DOCUMENTS 7,394,276 B2    7/2008  Gerbara et al.
7,395,518 B2 *  7/2008  Ciplickas ................ H01L 22/20
                                                 324/762.02
(Continued)

*Primary Examiner* — Binh C Tat
(74) *Attorney, Agent, or Firm* — Pillsbury Winthrop Shaw Pittman LLP

(57) ABSTRACT

A method is disclosed for designing a test vehicle utilizing a layout of a real integrated circuit (IC) product. The method comprises: importing an original full-chip layout of the real IC product; partitioning the original full-chip layout into probe groups, each probe group comprising probe pads, and, a plurality of IC devices within an area of interest (AOI) having original routing interconnect for those IC devices; selecting a set of IC devices within the AOI; and, for the selected set of IC devices, using pattern extraction to remove the original routing interconnect, and create customized interconnect layers (CIL) to reconfigure connection between the individual IC devices. Incorporating the selected set of IC devices with the CIL into the original full-chip layout creates a modified full-chip layout such that a wafer fabricated using the modified full-chip layout comprises a real product with a built-in test vehicle.

15 Claims, 11 Drawing Sheets

(58) Field of Classification Search
CPC ............. G06F 9/30098; G06F 9/3016; G06F 2217/12; G06F 17/5072; G06F 19/3456; H01L 2224/73265; H01L 27/0688; H01L 27/10876; H01L 24/83; G05B 2219/37337; H04B 17/309
USPC ................................................ 716/111–116
See application file for complete search history.

(56) References Cited

U.S. PATENT DOCUMENTS

| | | |
|---|---|---|
| 7,405,585 B2 | 7/2008 | Doong |
| 7,446,553 B2 | 11/2008 | Cano et al. |
| 7,489,151 B2 | 2/2009 | Hess et al. |
| 7,512,509 B2 | 3/2009 | Bhushan et al. |
| 7,701,242 B2 | 4/2010 | Bordelon, Jr. |
| 7,902,852 B1 | 3/2011 | Hess et al. |
| 9,496,119 B1 | 11/2016 | De et al. |
| 2005/0045821 A1 | 3/2005 | Noji et al. |
| 2005/0086617 A1* | 4/2005 | Ciplickas ............... H01L 22/20 324/750.3 |
| 2005/0121611 A1 | 6/2005 | Kimba et al. |
| 2008/0263486 A1* | 10/2008 | Alexanian ...... G01R 31/318314 716/106 |
| 2009/0294664 A1 | 12/2009 | Chen et al. |
| 2012/0286796 A1 | 11/2012 | Ketchen et al. |
| 2013/0019216 A1* | 1/2013 | Vasudevan ............ G06F 17/504 716/106 |
| 2013/0027075 A1 | 1/2013 | Shao et al. |

\* cited by examiner

DIRECT PROBING CHARACTERIZATION VEHICLE FOR TRANSISTOR, CAPACITOR AND RESISTOR TESTING

RELATED APPLICATIONS

This application claims the benefit of U.S. Provisional Patent Application Ser. No. 62/222,128 filed Sep. 22, 2015 and is incorporated herein in its entirety.

BACKGROUND OF THE INVENTION

Field of the Invention

The disclosure relates to designing and fabricating a test vehicle built-into a product wafer by modifying a product layout for an integrated circuit (IC) chip.

Brief Description of the Prior Art

For IC device characterization, usually a dedicated test wafer is used, that requires a separate layout for fabricating the test structures, i.e. the layout is different from the real product layout. If test structures are built into the same wafer where the real product ICs are, then to accommodate the difference between the test structures and the real product ICs, the process flow becomes more complicated, and the process time becomes longer than usual. Also, though there are various test vehicles available for transistors and resistors, capacitor measurement test vehicles are usually very different from those for transistors and resistors. Some relevant prior art includes U.S. Pat. No. 7,405,585, US 2013/027075, US 2012/286796, U.S. Pat. Nos. 7,394,276, 7,512,509, 7,446,553, 7,701,242, 7,902,852, 7,489,151. What is needed is a method for designing a test vehicle that can work for characterizing transistors, resistors as well as capacitors, while introducing minimal disruption in the process flow, and preferably utilizing the same layout that is used to fabricate the real product IC chip.

SUMMARY

A method is disclosed for designing a test vehicle utilizing a layout of a real integrated circuit (IC) product, the method comprising: importing an original full-chip layout of the real IC product; partitioning the original full-chip layout into a plurality of probe groups, each probe group comprising a plurality of probe pads, and, a plurality of IC devices within an area of interest (AOI) having original routing interconnect for those IC devices; selecting a set of IC devices within the AOI; for the selected set of IC devices, using pattern extraction to remove the original routing interconnect, and create customized interconnect layers (CIL) to reconfigure connection between the individual IC devices; and, incorporating the selected set of IC devices with the CIL into the original full-chip layout to create a modified full-chip layout such that a wafer fabricated using the modified full-chip layout comprises a real product with a built-in test vehicle. The device under test can be a transistor under test (TUT), capacitor under test (CUT), or a resistor under test (RUT).

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION OF THE EMBODIMENTS

Figure 1:
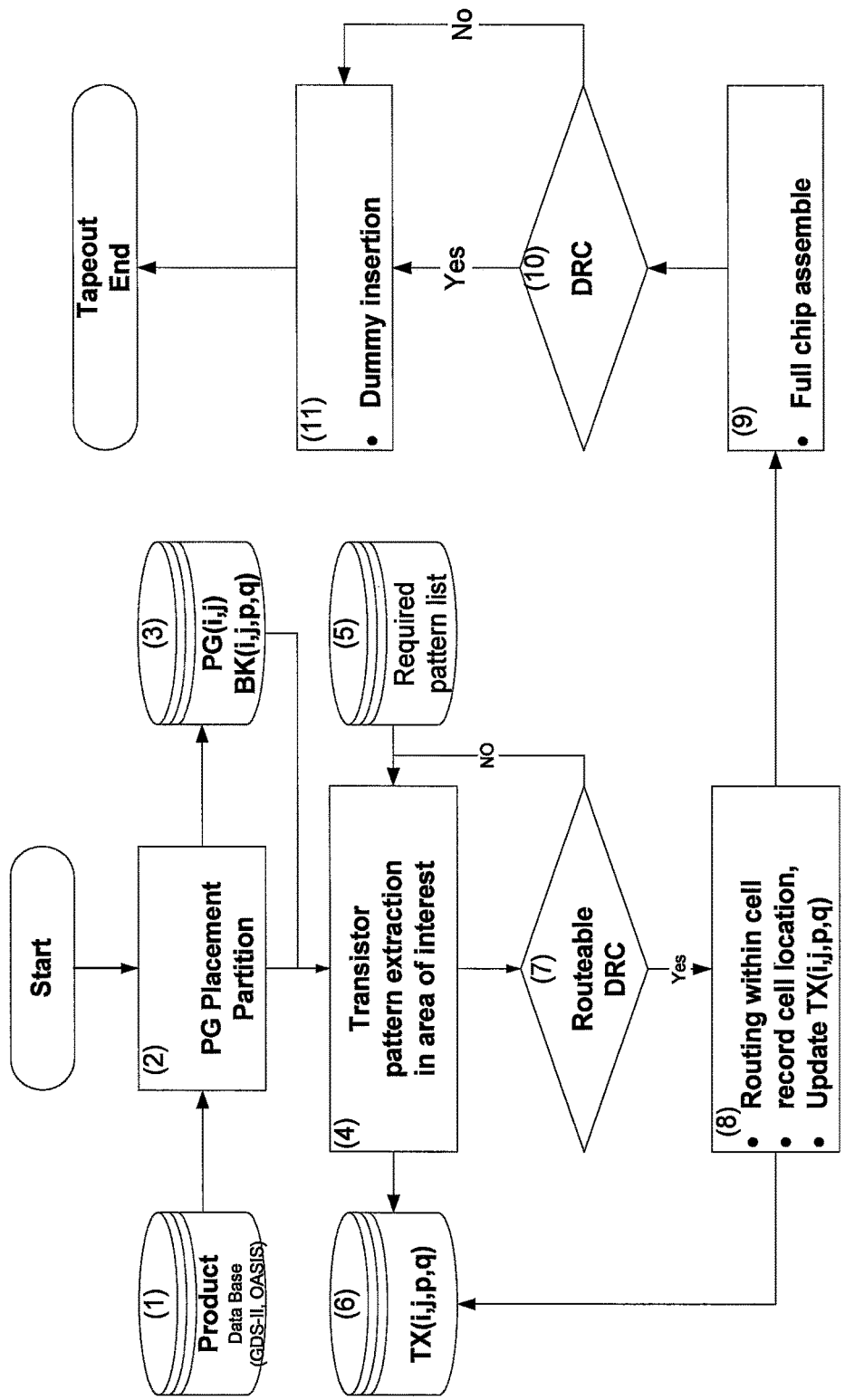
FIG. 1 illustrates a design flow of direct probing characterization vehicle (DPCV) for TUT and its application to improve process and yield.

Embodiments of the present invention will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

A test vehicle comprises multiple product layers which are used to build transistors (except original interconnect layers that are removed) and one or more Customized Interconnect Layers (CILs), which can be used to select one of (a) select transistor-under-tests (TUTs), resistors under test (RUTs) and capacitors under test (CUTs). The transistors, resistors and/or capacitors within the product can be connected to four probe pads for characterization by CILs. The Probe Group (PG) comprised of probe pads, routing interconnect and Area-Of-Interest (AOI), where any of transistors located in AOI can be selected as TUTs. The PGs are evenly placed across product chip. Thus, transistors, resistors and capacitors within AOI across a full product can be connected through CILs for testing.

This test vehicle, as described, allows for a wafer that includes chips containing transistors, resistors and capacitors that will become the actual product to use such transistors, resistors and capacitors that will become the actual product as the TUTs, RUTs and CUTs.

Specifically, the wafer that can be used may only contain the front-end line of layers necessary to produce the transistors, resistors and capacitors that will become the actual product, which include the active, gate, ion implantation and stress layers. As such, the wafer that is used for testing need not contain the metal layers for routings that will be implemented to make interconnections therebetween for the actual product. Rather, as described, with only necessary layers as described above being disposed on the test wafer, the CILs are fabricated over such layers, thereby allowing for the direct testing of the various transistors, resistors and capacitors the full product. As a result, it is possible to take the real product design and turn it into transistor/resistor/capacitor test chip (array). Since the transistors/resistors/capacitors are inside real product environment, other than the CIL for routing, all behaviors/issues in transistors/resistors/capacitors can be tested as they behave in the real product design.

An aspect that is common to the selection of the TUTs, RUTs and CUTs is that pattern extraction is used to determine the pattern of the material of the top layer of the wafer that is used to produce the transistors, resistors and capacitors that will become the actual product. While separate descriptions are provided hereinafter for each testing of each of transistors, resistors and capacitors, with a separate identification of pattern extraction for each being provided, another advantage of the direct probing characterization vehicle as described is that pattern extraction can be commonly performed, as can the initial chip partitioning into probe groups, as described.

Another advantageous aspect, as described, is that CILs can be fabricated in multiple layers, including multiple metal layers—similar to actual product. As such, it is possible to probe a much larger number of devices per mil-square; on the order of 8,000 devices rather than a conventional amount of around 80 devices.

The descriptions provided hereinafter provide additional specifics for the testing of transistors, resistors and capacitors that exist on the wafer and are used to make actual product—and thus become the TUTs, RUTs and CUTs as described, along with the manner of making the CILs associated therewith.

Transistor Under Test (TUT)

For TUT method, a test vehicle comprises multiple product layers which are used to build transistors whose original interconnect layers are removed and one or more Customized Interconnect Layers (CILs) are introduced to select transistor-under-tests (TUTs). The transistors within the product can be connected to four probe pads for I-V characterization by CILs. With the aid of self-gated approach, Drain/Source probe pads can be shared within one transistor array and Gate/Substrate probe pads can be shared across transistor arrays. The Probe Group (PG) comprised of probe pads, routing interconnect and Area-Of-Interest (AOI), where any of transistors located in AOI can be selected as TUTs. The PGs are evenly placed across product chip. Thus, transistors within AOI across full product can be connected through CILs.

FIG. 1 shows a process flow for designing a test vehicle for a TUT. This process flow is geared towards process/yield improvement. The Direct Probing Characterization Vehicle (DPCV) design starts from importing the product chip into database such as OpenAccess (OASIS), or GDSII, as shown in step (1) of FIG. 1. The original full-chip layout of the real product is the starting point. Full chip floor plan is shown in in FIG. 2.

Figures 2, 3:
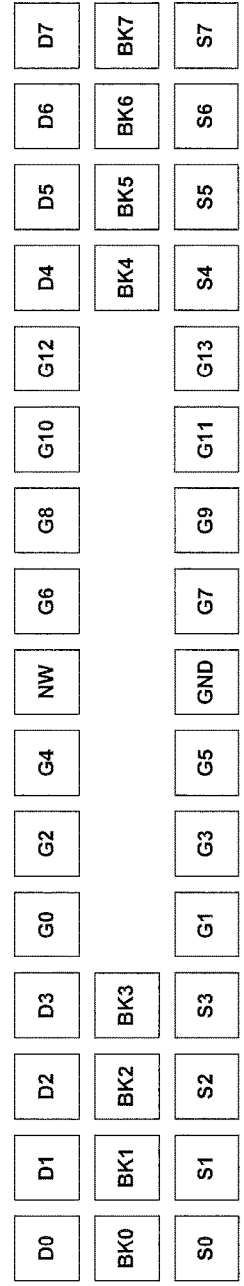
FIG. 2 illustrates floor plan of a probe group.
FIG. 3 illustrates floor plan of probe pads and areas of interest for TUT.

The next step (2) in FIG. 1 is partitioning and probe group (PG) placement. By measuring chip size at X- and Y-direction, the full chip is evenly partitioned into bounded areas called probe groups (PGs), as shown in FIG. 2. Each PG(i,j) comprises probe pads for Drain (Dm), Source(Sm), Gate (Gn) and Substrate (either for PMOS referred to as NW or for NMOS referred to as GND) and area for TUTs referred to as Blocks (BKm). The m-index for Drain/Source/Block is from 0 to 7 and n-index for Gate is 0 to 13 in a particular illustrative example shown in FIG. 3. In FIG. 3, $S_i$ (i=0-7) are probe pads of source, $D_i$ (i=0-7) are probe pads of drain, $G_i$ (i=0-13) are probe pads for gate, NW are probe pads of NWell, GND is probe pad of p-substrate, $BK_i$ (i=0-7) is probe pads for area of interest.

Figure 6:
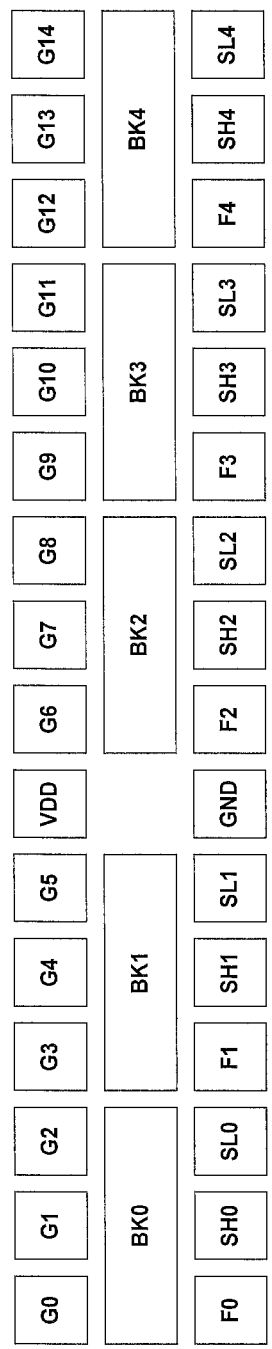
FIG. 6 illustrates floor plan of probe pads and areas of interest for RUT.
Figure 10:
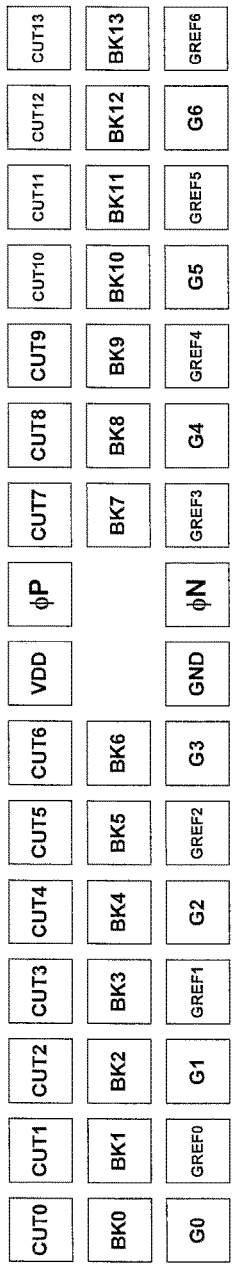
FIG. 10 illustrates floor plan of probe pads and areas of interest for CUT.

Persons skilled in the art would readily understand that the scope of the embodiments are not limited by the illustrative number of probe pads shown in FIG. 3, 6 or 10. Further, note that the subscripts m and n are interchangeable respectively with the subscripts p and q shown in FIG. 1. For example, BK (i, j, m, n) is the same as BK (i, j, p, q).

This configuration is suitable for "self-gated multiplexing," in which TUTs are commonly connected in Drain, Source and Substrate. Each of TUTs' Gate is directly connected to probe pad. Thus, each of TUTs can be controlled by its own Gate.

To maximize TUT counts, the following optimization process is followed:

Given N: total of probe pads and assuming 2 pads for NW and GND.

To find G: total of Gate pads

Drain and Source are common shared within one block.

Thus, no. of total blocks is equal to (N−2−G)/2 with the constraint that (N−2−G)/2 is an integer.

$$TUT \text{ counts are equal to } \frac{(N-2-G)}{2} \times G$$

$$\frac{(N-2-G)}{2} \times G = -\frac{1}{2}\left(G^2 - 2 \times \frac{N}{2} \times G + \left(\frac{N}{2}\right)^2\right) - 1 + \frac{1}{2} \times \left(\frac{N}{2}\right)^2 =$$

$$-\frac{1}{2}\left(G - \frac{N}{2}\right)^2 - 1 + \frac{1}{2} \times \left(\frac{N}{2}\right)^2 \leq -1 + \frac{N^2}{8}$$

In the above example, we choose N=32, G=14 and TUTs=112.

To maintain reliable threshold voltage measurement, total TUTs per block is limited by the following:

$$ILeak(i, j, m, n) = \sum_{\substack{p=0 \\ p \neq n}}^{G-1} I_{Doff}(i, j, m, p),$$

where n-transistor in m-Block will be measured and the other transistors in m-Block are off.

$SS_{th}(i,j,m,n)$: sub-threshold slope (mV/dec.)

$dV_{error}$: maximum tolerance for $V_{th}$ measurement (mV).

$I_{th}(i,j,m,n)$: the current flow through k-transistor when VGate is equal to threshold voltage and $V_{Drain}=V_{DD}$, $V_{Source}=0$ for NMOS and $V_{Drain}=-V_{DD}$, $V_{Source}=0$ for PMOS.

$$\log(I_{th}(i, j, m, n) + ILeak(i, j, m, n)) - \log(I_{th}(i, j, m, n)) \le \frac{dV_{error}}{SS_{th}(i, j, m, n)}$$

$$ILeak(i, j, m, n) \le I_{th}(i, j, m, n) \times \left(10^{dV_{error}/SS_{th}^{(i,j,m,n)}} - 1\right) \text{ for } n = 0 \sim G - 1.$$

To maximize total TUT counts and maintain reliable threshold voltage measurement, the Gate pads can be evenly distributed among PG.

Going back to the process from of FIG. 1, PG placement and partition in step (2) of FIG. 1, will produce a PG location for placement PG(i,j) and TUT slot information BK(i, j, p, q) (same as BK (i, j, m, n)) including location and slot size, shown in step (4) in FIG. 1.

Target TUTs are selected from either the result of pattern extraction, as shown in step (4), or the predefined risky transistor failure pattern from the previous design as shown in step (5) of FIG. 1. TUT in each of BK(i, j, p, q) will stored in TX(i, j, p, q) (same as TX(i, j, m, n)) as showed in step (6) of FIG. 1.

Routability check and design rule check (DRC) are performed in steps (7) and (8) in FIG. 1. The result is updated to step (7) or will ask extraction procedure in step (4) to provide a new TUT. The closed loop between steps (4) and (7) will end at the condition that it find TUT is routable and DRC clean, or there is no TUT available in that slot. The later will flag TX(i, j, p, q) (same as TX(i, j, m, n)) as empty cell.

A routing procedure in step (8) will take information from TX(i, j, m, n) and perform interconnect routing to connect Drain/Source/Gate to probe pads.

A full chip assembly procedure in step (9) of FIG. 1 will take result from step (8) and place all TUTs into PG and assembly all PGs into full chip.

Optionally, DRC is performed again in step (10). This procedure will discover violations in full chip density and the boundary among PGs.

Additionally, the optional step of dummy insertion can be incorporated in the process flow, as shown in step (11) to fulfill manufacturing requirement such as multiple mask density balancing, CMP planarization and etc.

DRC can be performed again after dummy insertion. This procedure will discover violations in full chip post dummy insertion and multiple masks balancing.

Voltage setting for all pins as listed in Table 1. Block leakage can be measured by turn off all gates. Block leakage can be measured by turn off all ASUs. Within blocks, TUT is tested in sequence. Across block and PGs, testing can be performed in parallel.

TABLE 1

Voltage setting of probe pads for various test modes

| | NMOS | | | PMOS | | |
|---|---|---|---|---|---|---|
| Test Mode | Block Leakage ILeak (i, j, m) m = 0 ~ 7 | Saturation $I_D \sim V_G$ | Linear $I_D \sim V_G$ | Block Leakage ILeak (i, j, m) m = 0 ~ 7 | Saturation $I_D \sim V_G$ | Linear $I_D \sim V_G$ |
| D0 | Vdd | Vdd | 0.05 | 0 | 0 | Vdd ~ 0.05 |
| D1 | Vdd | Vdd | 0.05 | 0 | 0 | Vdd ~ 0.05 |
| D2 | Vdd | Vdd | 0.05 | 0 | 0 | Vdd ~ 0.05 |
| D3 | Vdd | Vdd | 0.05 | 0 | 0 | Vdd ~ 0.05 |
| D4 | Vdd | Vdd | 0.05 | 0 | 0 | Vdd ~ 0.05 |
| D5 | Vdd | Vdd | 0.05 | 0 | 0 | Vdd ~ 0.05 |
| D6 | Vdd | Vdd | 0.05 | 0 | 0 | Vdd ~ 0.05 |
| D7 | Vdd | Vdd | 0.05 | 0 | 0 | Vdd ~ 0.05 |
| S0 | 0 | 0 | 0 | Vdd | Vdd | Vdd |
| S1 | 0 | 0 | 0 | Vdd | Vdd | Vdd |
| S2 | 0 | 0 | 0 | Vdd | Vdd | Vdd |
| S3 | 0 | 0 | 0 | Vdd | Vdd | Vdd |
| S4 | 0 | 0 | 0 | Vdd | Vdd | Vdd |
| S5 | 0 | 0 | 0 | Vdd | Vdd | Vdd |
| S6 | 0 | 0 | 0 | Vdd | Vdd | Vdd |
| S7 | 0 | 0 | 0 | Vdd | Vdd | Vdd |
| G0 | 0 | 0 ~ Vdd | 0 ~ Vdd | Vdd | 0 ~ Vdd | 0 ~ Vdd |
| G1 | 0 | 0 ~ Vdd | 0 ~ Vdd | Vdd | 0 ~ Vdd | 0 ~ Vdd |
| G2 | 0 | 0 ~ Vdd | 0 ~ Vdd | Vdd | 0 ~ Vdd | 0 ~ Vdd |
| G3 | 0 | 0 ~ Vdd | 0 ~ Vdd | Vdd | 0 ~ Vdd | 0 ~ Vdd |
| G4 | 0 | 0 ~ Vdd | 0 ~ Vdd | Vdd | 0 ~ Vdd | 0 ~ Vdd |
| G5 | 0 | 0 ~ Vdd | 0 ~ Vdd | Vdd | 0 ~ Vdd | 0 ~ Vdd |
| G6 | 0 | 0 ~ Vdd | 0 ~ Vdd | Vdd | 0 ~ Vdd | 0 ~ Vdd |
| G7 | 0 | 0 ~ Vdd | 0 ~ Vdd | Vdd | 0 ~ Vdd | 0 ~ Vdd |
| G8 | 0 | 0 ~ Vdd | 0 ~ Vdd | Vdd | 0 ~ Vdd | 0 ~ Vdd |
| G9 | 0 | 0 ~ Vdd | 0 ~ Vdd | Vdd | 0 ~ Vdd | 0 ~ Vdd |
| G10 | 0 | 0 ~ Vdd | 0 ~ Vdd | Vdd | 0 ~ Vdd | 0 ~ Vdd |
| G11 | 0 | 0 ~ Vdd | 0 ~ Vdd | Vdd | 0 ~ Vdd | 0 ~ Vdd |
| G12 | 0 | 0 ~ Vdd | 0 ~ Vdd | Vdd | 0 ~ Vdd | 0 ~ Vdd |
| G13 | 0 | 0 ~ Vdd | 0 ~ Vdd | Vdd | 0 ~ Vdd | 0 ~ Vdd |
| NW | Vdd | Vdd | Vdd | Vdd | Vdd | Vdd |
| GND | 0 | 0 | 0 | 0 | 0 | 0 |

Figure 4:
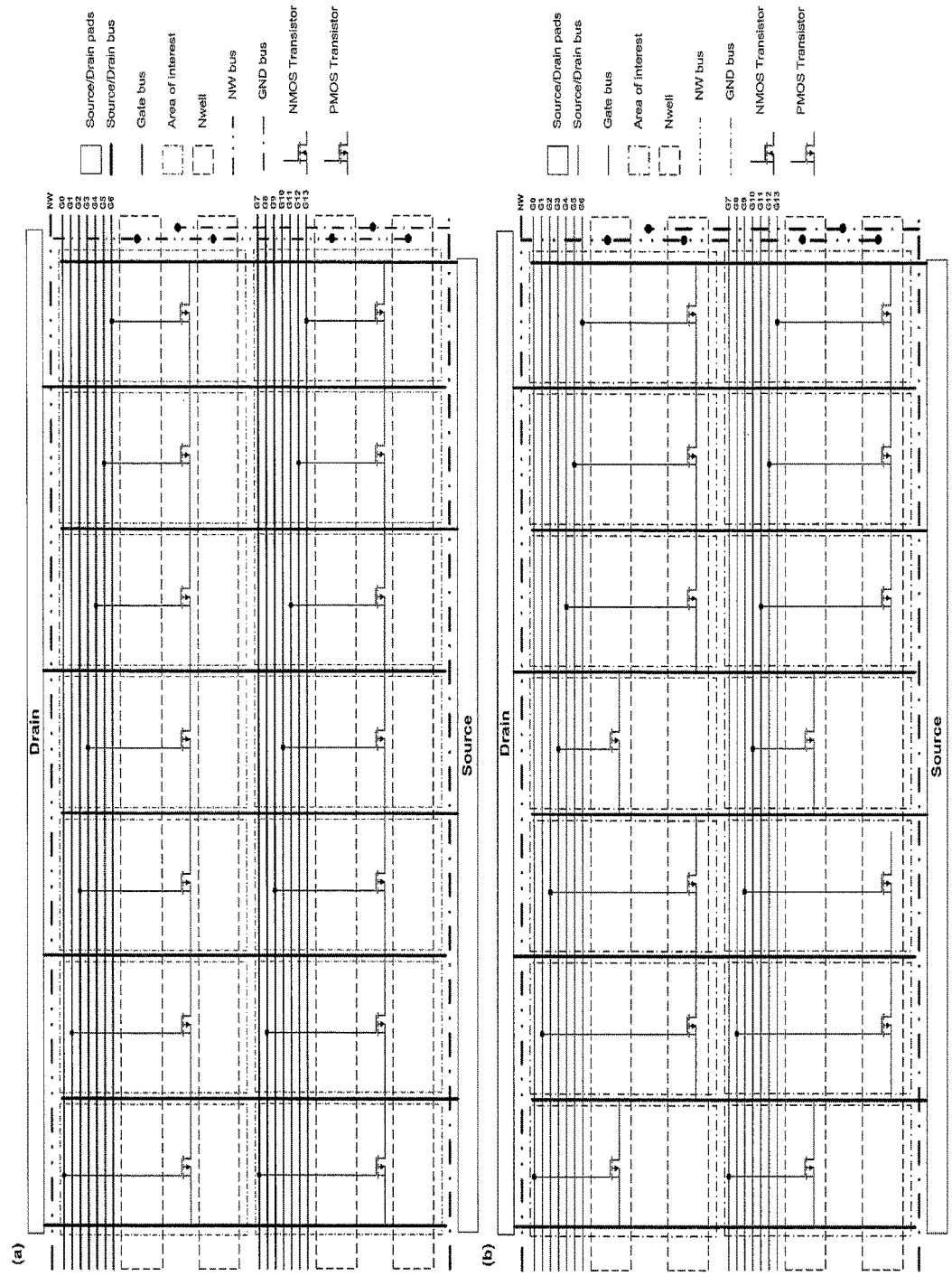
FIG. 4 illustrates floor plan and schematic of TUT inside an area of interest; (a) NMOs transistor selected as TUTs; (b) PMOS transistors selected as TUTs.

FIG. 4 shows the floor plan and schematic of TUT inside the area-of-interest. FIG. 4(*a*) shows NMOS transistors selected as TUT, and FIG. 4(*b*) shows PMOS transistors selected as TUTs.

The advantage of the process flow shown in FIG. 1 is that it turns product design into transistor array test chip by reusing all or a substantial number of the front-end-of-the-line (FEOL) or middle-of-the-line (MOL) product design layers and one or more interconnect customized design layer to connect transistors in product chip to probe pads. Direct gate access is implemented for each TUTs from common gate connection for transistor I-V characterization. Pattern extraction inside area-of-interest is used to select transistor set to represent all transistor layout style in product chip. Predefined failure/risky pattern may be used in the pattern extraction process using what is learned from legacy technology or previous design. All selected of TUTs in this test chip conform with the FEOL/MOL pattern density.

Resistor Under Test (RUT)

A test vehicle for resistor measurement comprises multiple product layers which are used to form transistors for analog switch and inverter, and one or more Customized Interconnect Layers (CILs) used to connect switches and inverters/pseudo-inverters into addressable analog switch units (AASUs) for resistor measurement. The address signal is directly connected to each AASU without decoder to minimize the routing complexity. AASU comprises an inverter and a plurality of switches. Number of switches may be 3 or 4 in an example. Of the switches, there are two p-type transistors for high-side force switch and high-side voltage sensing, and at least one n-type transistor for low-side voltage sensing. If four switches are used, there may be two n-type transistors for low-side voltage sensing and low-side force switch respectively.

The Probe Group (PG) comprises probe pads, routing interconnect and Area-Of-Interest (AOI), such that any of AASUs located in AOI will be connected to PG. The PGs are evenly placed across product chip. Thus, the product chip can be transformed into a test chip with millions of 4-port resistor cells.

Figure 5:
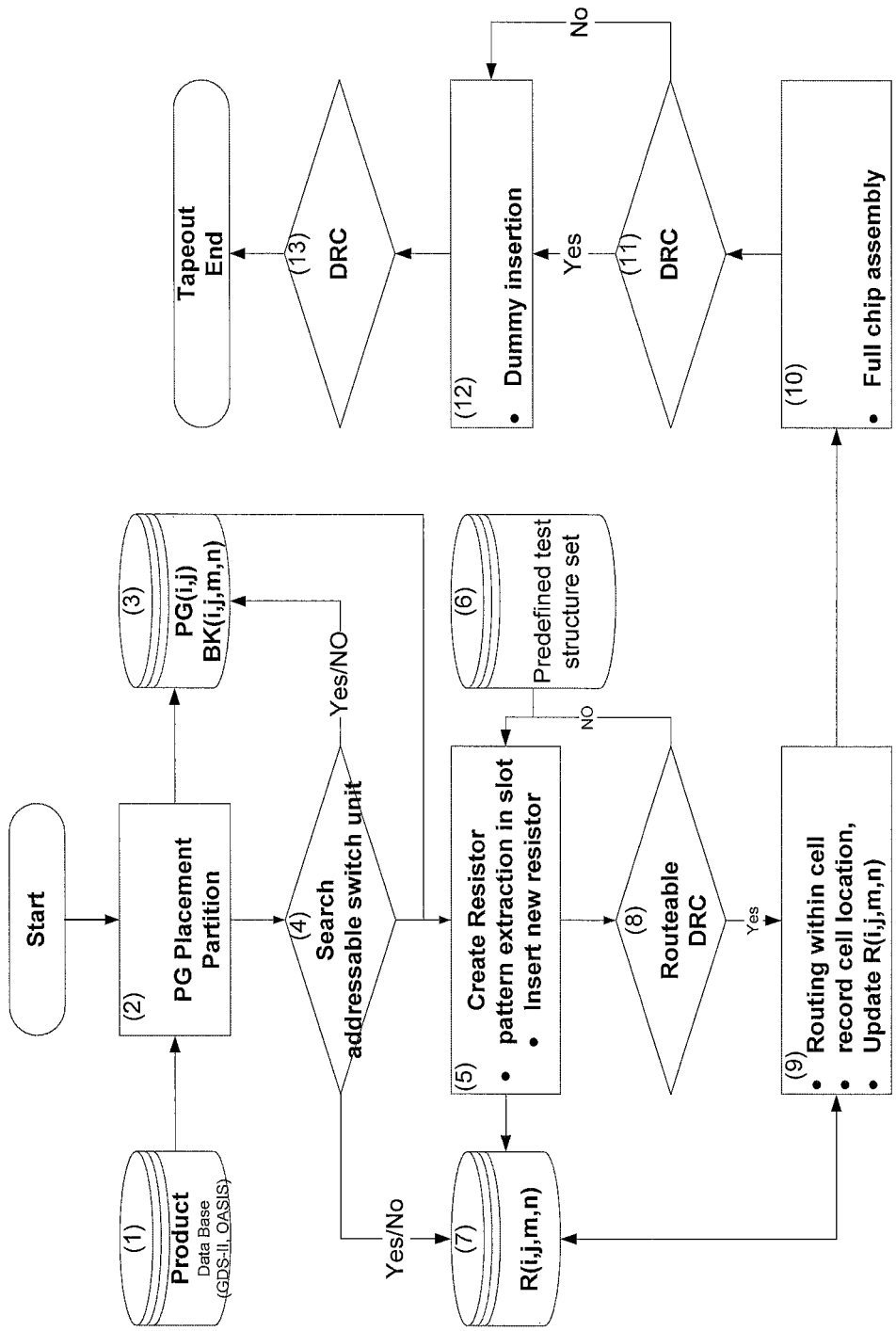
FIG. 5 illustrates a design flow of direct probing characterization vehicle (DPCV) for RUT and its application to improve process and yield.

FIG. 5 shows a process flow for the RUT characterization design suitable for a resistor array. The design of on-chip resistor array starts from importing the product chip into database such as OASIS or GDSII, as shown in step (1) of FIG. 5. A full chip floor plan for RUT would also be similar to what is shown for TUT in FIG. 2. By measuring chip size at X- and Y-direction, the full chip is evenly partitioned into rectangular areas called probe groups (PGs). For each PG(i, j), it comprises of probe pads for ForceHigh($F_m$), SenseHigh ($SH_m$), SenseLow($SL_m$) and Powers (VDD/GND) and area for RUTs called as Blocks ($BK_m$). The m-index for ForceHigh/SenseHigh/SenseLow is from 0 to 4 and n-index for Gate is 0 to 14 as illustrated in FIG. 6. VDD are the probe pads for the NWell. GND is the probe pad for p-substrate. BK is a block of area of interest. In FIG. 6, $F_i$ (i=0-4) are probe pads of ForceHigh, $SH_i$ (i=0-4) are probe pads of SenseHigh, $SL_i$ (i=0-4) are probe pads for SenseLow, $G_j$ (i=0-14) are probe pads for gate; GND is probe pad of p-substrate, Vdd probe pad for NWell, $BK_i$ (i=0-4) is probe pads for areas of interest.

PG placement and partition step (2) will produce a PG location for placement PG(i,j) and RUT slot information BK(i, j, m, n) including location and slot size which are recorded in step (3) of FIG. 5.

In step (4) of FIG. 5, NMOS/PMOS to form AASU are searched. Once AASU found, it is recorded into BK(i, j, m, n) and flagged as valid R(i, j, m, n). Target RUTs are selected from either the result of pattern extraction as shown in step (5) of FIG. 5, or the predefined risky resistor failure pattern from the previous design as shown in step (6) of FIG. 5. RUT in each of BK(i, j, m, n) will stored in R(i, j, m, n) as shown in step (7).

Routability check and design rule check (DRC) are performed in step (8) of FIG. 5. The result is updated to step (7) or will ask procedure step (5) to provide a new RUT. The closed loop between steps (4) and (8) will end at the condition that it finds RUT is routable and DRC is clean, or there is no RUT available in that slot. The later will flag R(i, j, m, n) as empty cell.

A routing procedure in step (9) will take information from R(i, j, m, n) and perform interconnect routing to connect ForceHigh/SenseHigh/SenseLow to probe pads.

A full chip assembly procedure in step (10) will take result from step (9) and place all RUTs into PG and assembly all PGs into full chip.

DRC is performed again in step (11). This procedure will discover violations in full chip density and the boundary among PGs.

Dummy insertion is done in step (12) to fulfill manufacturing requirement such as multiple mask density balancing, CMP planarization and etc.

DRC is performed again in step (13). This procedure will discover violations in full chip post dummy insertion and multiple masks balancing.

Persons skilled in the art would recognize that some of the DRC and dummy insertion steps may be optional, depending on accuracy and manufacturing requirement.

Block leakage can be measured by turn off all AASUs. Within blocks, RUT is tested in sequence. Across block and PGs, testing can be performed in parallel.

The advantages listed for the TUT are also applicable for RUT, such as:

Turn product design into resistor array test chip by reusing all FEOL/MOL product design layers and one or more interconnect customized design layer to connect transistors in product chip to probe pads.

Direct access to each of RUTs for resistor measurement.

Resistor selection is done from the result of one or more of:

Pattern extraction inside area-of-interest to select transistor set to represent all transistor layout style in product chip.

Predefined failure/risky pattern which are learned from legacy technology or previous design.

All of RUTs in this test chip are within the same FEOL/MOL pattern density.

To maximize RUT counts, we can follow the process below:

Assumption: either 3 ports or 4 ports per AASU and either 1 or 2 pads per gate control line.

Given N: total of probe pads and 2 pads for NW and GND.

To find G: total of Gate pads

For 3 ports ASU: ForceHigh, SenseHigh and SenseLow are commonly shared within AASU block. For 4 ports ASU: ForceHigh, SenseHigh, ForceLow and SenseLow shared within AASU block. Schematic of various AASUs with resistor, as shown in FIG. 7(a)-(d).

Figure 7:
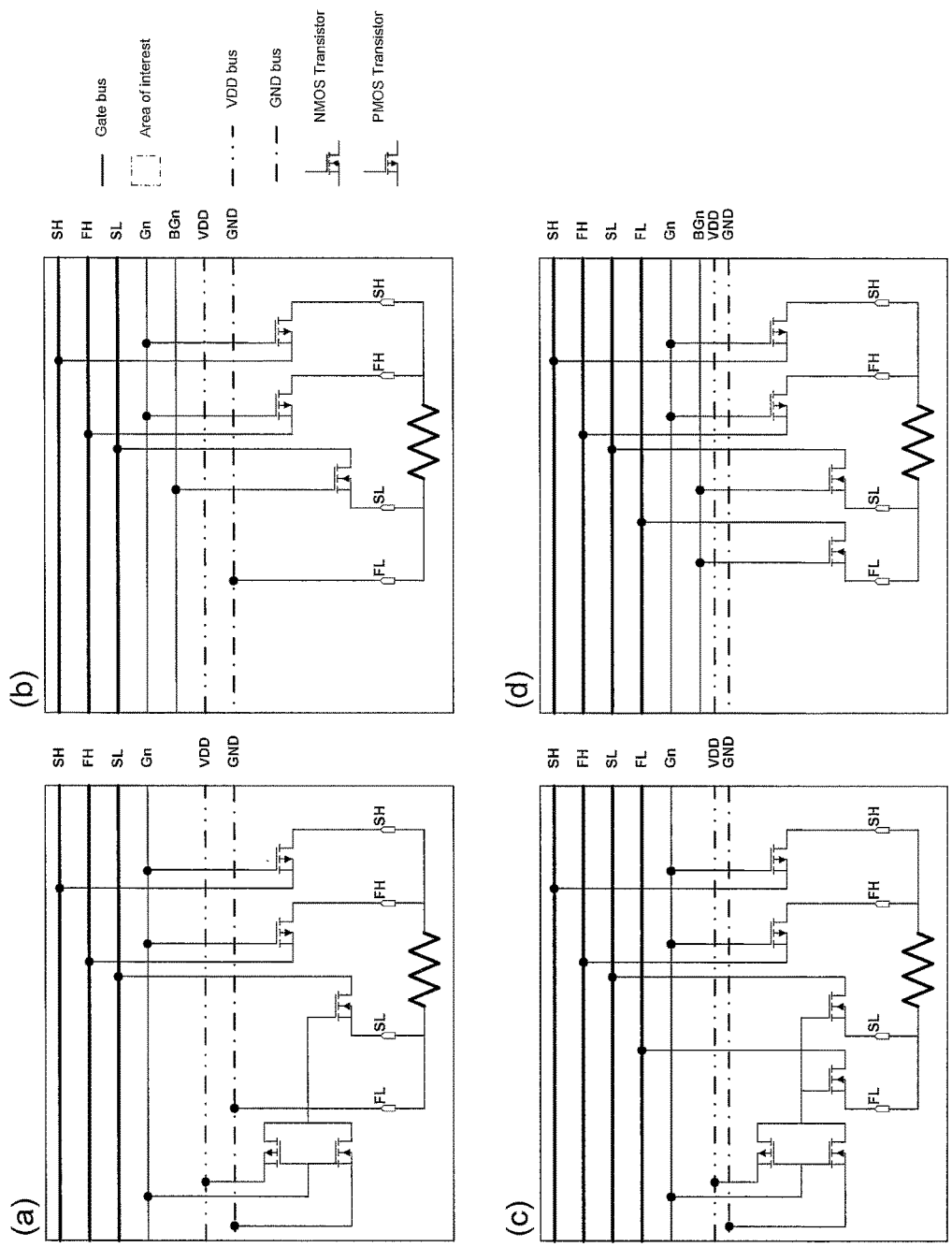
FIG. 7 illustrates schematic of various AASUs with resistors with either 3 or 4 ports.
Figure 8:
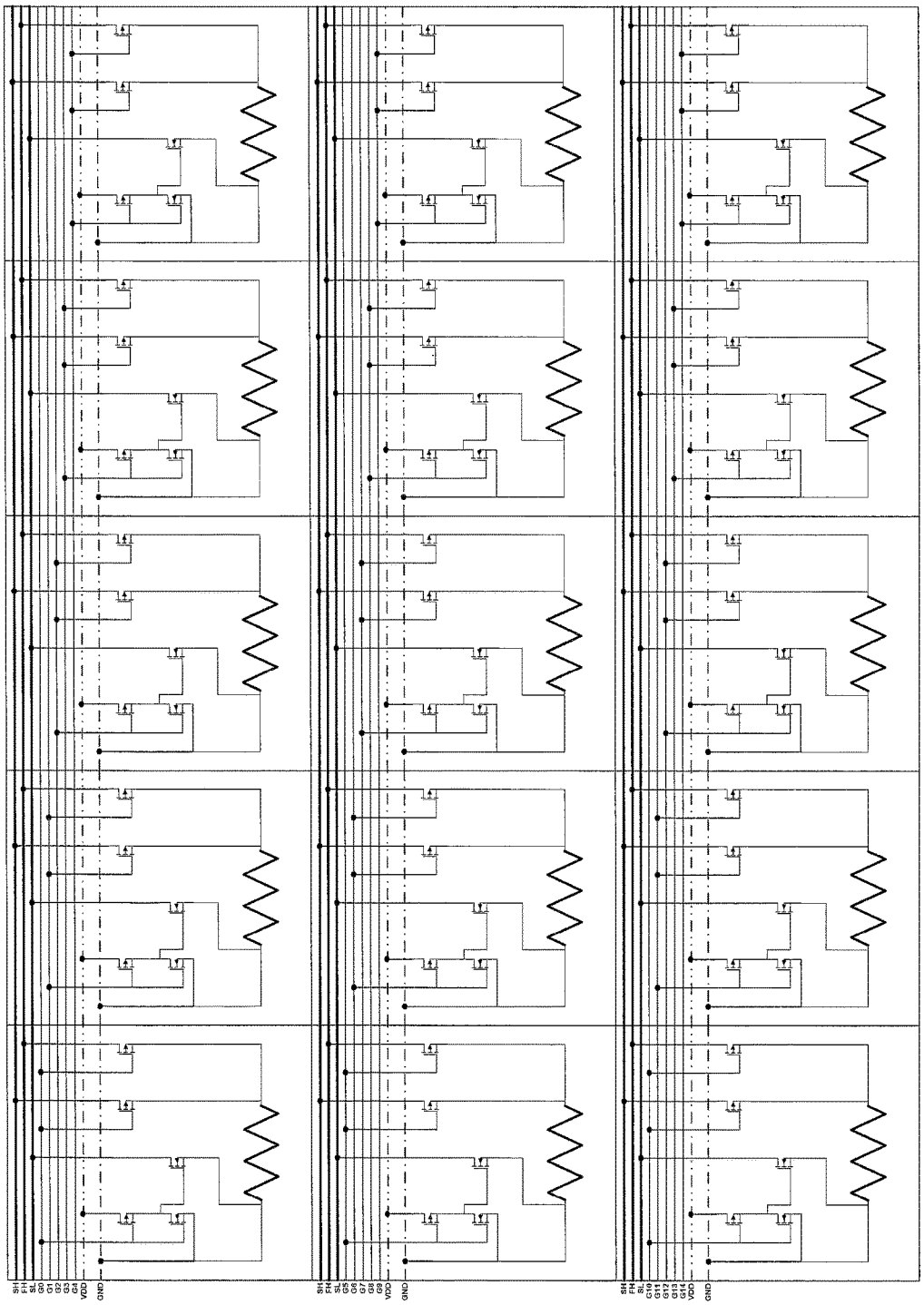
FIG. 8 illustrates floor plan and schematic of RUT inside an area of interest.

| Schematic | VDD Gnd | Ports of resistors | Gate-lines per Cells | Maximum Cell counts | Constraints |
|---|---|---|---|---|---|
| FIG. 7(a) | 2 | 3 | 1 | $\frac{(N-2-G)}{3} \times G = -\frac{1}{3}\left(G^2 - 2 \times \frac{N-2}{2} \times G + \left(\frac{N-2}{2}\right)^2\right) + \frac{1}{3} \times \left(\frac{N-2}{2}\right)^3 = -\frac{1}{3}\left(G - \frac{N-2}{2}\right)^2 + \frac{1}{3} \times \left(\frac{N-2}{2}\right)^2 \leq \frac{(N-2)^2}{12}$ | $\frac{(N-2-G)}{3}$ is integer |

-continued

| Schematic | VDD Gnd | Ports of resistors | Gate-lines per Cells | Maximum Cell counts | Constraints |
|---|---|---|---|---|---|
| FIG. 7(b) | 2 | 3 | 2 | $\frac{(N-2-G)}{3} \times \frac{G}{2} =$ $-\frac{1}{6}\left(G^2 - 2 \times \frac{N-2}{2} \times G + \left(\frac{N-2}{2}\right)^2\right) + \frac{1}{6} \times \left(\frac{N-2}{2}\right)^2 =$ $-\frac{1}{6}\left(G - \frac{N-2}{2}\right)^2 + \frac{1}{6} \times \left(\frac{N-2}{2}\right)^2 \leq \frac{(N-2)^2}{24}$ | $\frac{(N-2-G)}{3}$ and $\frac{G}{2}$ are integers |
| FIG. 7(c) | 2 | 4 | 1 | $\frac{(N-2-G)}{4} \times G =$ $-\frac{1}{4}\left(G^2 - 2 \times \frac{N-2}{2} \times G + \left(\frac{N-2}{2}\right)^2\right) + \frac{1}{4} \times \left(\frac{N-2}{2}\right)^2 =$ $-\frac{1}{4}\left(G - \frac{N-2}{2}\right)^2 + \frac{1}{4} \times \left(\frac{N-2}{2}\right)^2 \leq \frac{(N-2)^2}{16}$ | $\frac{(N-2-G)}{4}$ is integer |
| FIG. 7(d) | 2 | 4 | 2 | $\frac{(N-2-G)}{4} \times \frac{G}{2} =$ $-\frac{1}{8}\left(G^2 - 2 \times \frac{N-2}{2} \times G + \left(\frac{N-2}{2}\right)^2\right) + \frac{1}{8} \times \left(\frac{N-2}{2}\right)^2 =$ $-\frac{1}{8}\left(G - \frac{N-2}{2}\right)^2 + \frac{1}{8} \times \left(\frac{N-2}{2}\right)^2 \leq \frac{(N-2)^2}{32}$ | $\frac{(N-2-G)}{4}$ and $\frac{G}{2}$ are integers |

To maintain reliable resistor sense measurement, total RUTs per block is limited by the following:

$$ILeak(i, j, m, n) = \sum_{\substack{p=0 \\ p \neq n}}^{G-1} ICell_{off}(i, j, m, p),$$

where $n^{th}$-AASU in $m^{th}$-Block is ON-state and the other AASUs in $m^{th}$-Block are OFF-states.

AASUs in $m^{th}$-Block are oOFF-states.

R(i,j,m,n): resistance of $n^{th}$-RUT at $m^{th}$-block of PG(i,j).
IRUT(i,j,m,n): current through $n^{th}$-RUT at $m^{th}$-block of PG(i,j).
VF0(i,j,m,n): voltage at F0-pad at $m^{th}$-block of PG(i,j) when IRUT(i,j,m,n) is measured.
VSH(i,j,m,n): voltage at SH-pad at $m^{th}$-block of PG(i,j) when IRUT(i,j,m,n) is measured.
VSL(i,j,m,n): voltage at SL-pad at $m^{th}$-block of PG(i,j) when IRUT(i,j,m,n) is measured.
SN: Signal to noise ratio.
VCC: voltage of power supply
$V_{th,N}$: threshold voltage of NMOS used in ASU
$V_{th,P}$: threshold voltage of PMOS used in ASU
$V_{min}$: minimum voltage across two sense port. For said, 20 mV is used in this case.

$Accuracy_{min}$: accuracy requirement, for said, 1% is used in $$\frac{IRUT(i, j, m, n)}{ILeak(i, j, m, n)} \geq SN$$

$$VSL(i, j, m, n) \leq V_{CC} - V_{th,N}$$

$$VSH(i, j, m, n) \geq V_{th,P}$$

$$VF0(i, j, m, n) \geq V_{th,P}$$

$$VSH(i, j, m, n) - VSL(i, j, m, n) \geq V_{min}$$

$$abs\left(\frac{\frac{VSH(i, j, m, n) - VSL(i, j, m, n)}{IRUT(i, j, m, n)} - R(i, j, m, n)}{R(i, j, m, n)}\right) \leq Accuracy_{min}$$

Given the above constraints of the above 6 equations for RUT design, NMOS/PMOS transistor used in AASU, RUT's resistance range, and parasitic resistance of RUT to GND, the accuracy will be obtained by running HSPICE simulation. Table 2 shows the accuracy (error) of RUT resistance versus parasitic resistance and the underlined values are above 1% error. Table 3 shows the voltage across two sense-port of RUT resistance versus parasitic resistance and the underlined values are below 20 mV.

TABLE 2 measurement accuracy of RUT vs. parasitic resistor

| Error (%) RUT(Ω) | Parasitic resistor (Ω) | | | | | | | | | | | | | |
|---|---|---|---|---|---|---|---|---|---|---|---|---|---|---|
| | 10 | 20 | 30 | 40 | 50 | 60 | 70 | 80 | 90 | 100 | 200 | 300 | 400 | 500 |
| 10000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 9000 | 0.0 | 0.0 | 0.0 | 0.0 | 0.0 | 0.0 | 0.0 | 0.0 | 0.0 | 0.0 | 0.0 | 0.0 | 0.0 | 0.0 |

TABLE 2-continued measurement accuracy of RUT vs. parasitic resistor

| Error (%) RUT(Ω) | Parasitic resistor (Ω) | | | | | | | | | | | | | |
|---|---|---|---|---|---|---|---|---|---|---|---|---|---|---|
| | 10 | 20 | 30 | 40 | 50 | 60 | 70 | 80 | 90 | 100 | 200 | 300 | 400 | 500 |
| 8000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 7000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 6000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 5000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 4000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 3000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 2000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 1000 | 0.0 | 0.0 | 0.0 | 0.0 | 0.0 | 0.0 | 0.0 | 0.0 | 0.0 | 0.0 | 0.0 | 0.0 | 0.0 | 0.0 |
| 900 | 0.0 | 0.0 | 0.0 | 0.0 | 0.0 | 0.0 | 0.0 | 0.0 | 0.0 | 0.0 | 0.0 | 0.0 | 0.0 | 0.0 |
| 800 | 0.0 | 0.0 | 0.0 | 0.0 | 0.0 | 0.0 | 0.0 | 0.0 | 0.0 | 0.0 | 0.0 | 0.0 | 0.0 | 0.0 |
| 700 | 0.0 | 0.0 | 0.0 | 0.0 | 0.0 | 0.0 | 0.0 | 0.0 | 0.0 | 0.0 | 0.0 | 0.0 | 0.0 | 0.0 |
| 600 | 0.1 | 0.1 | 0.1 | 0.1 | 0.1 | 0.1 | 0.0 | 0.0 | 0.0 | 0.0 | 0.0 | 0.0 | 0.0 | 0.0 |
| 500 | 0.2 | 0.2 | 0.1 | 0.1 | 0.1 | 0.1 | 0.1 | 0.1 | 0.1 | 0.1 | 0.0 | 0.0 | 0.0 | 0.0 |
| 400 | 0.4 | 0.4 | 0.3 | 0.3 | 0.3 | 0.3 | 0.3 | 0.2 | 0.2 | 0.2 | 0.1 | 0.1 | 0.0 | 0.0 |
| 300 | 0.9 | 0.9 | 0.8 | 0.8 | 0.7 | 0.7 | 0.6 | 0.6 | 0.6 | 0.5 | 0.3 | 0.1 | 0.1 | 0.0 |
| 200 | 2.7 | 2.5 | 2.4 | 2.2 | 2.1 | 2.0 | 1.8 | 1.7 | 1.6 | 1.5 | 0.8 | 0.4 | 0.2 | 0.1 |
| 100 | 10.1 | 9.4 | 8.9 | 8.3 | 7.8 | 7.3 | 6.9 | 6.5 | 6.1 | 5.7 | 3.0 | 1.6 | 0.8 | 0.5 |
| 90 | 11.9 | 11.2 | 10.5 | 9.9 | 9.3 | 8.7 | 8.2 | 7.7 | 7.2 | 6.8 | 3.6 | 1.9 | 1.0 | 0.5 |
| 80 | 14.2 | 13.4 | 12.6 | 11.8 | 11.1 | 10.4 | 9.8 | 9.2 | 8.6 | 8.1 | 4.3 | 2.3 | 1.2 | 0.6 |
| 70 | 17.3 | 16.3 | 15.3 | 14.4 | 13.5 | 12.7 | 11.9 | 11.2 | 10.5 | 9.9 | 5.2 | 2.8 | 1.5 | 0.8 |
| 60 | 21.5 | 20.2 | 19.0 | 17.8 | 16.8 | 15.7 | 14.8 | 13.9 | 13.1 | 12.3 | 6.5 | 3.5 | 1.8 | 1.0 |
| 50 | 27.4 | 25.8 | 24.2 | 22.8 | 21.4 | 20.1 | 18.9 | 17.8 | 16.7 | 15.7 | 8.3 | 4.4 | 2.3 | 1.2 |
| 40 | 36.5 | 34.3 | 32.2 | 30.3 | 28.5 | 26.8 | 25.1 | 23.6 | 22.2 | 20.8 | 11.1 | 5.9 | 3.1 | 1.7 |
| 30 | 51.7 | 48.6 | 45.7 | 43.0 | 40.4 | 38.0 | 35.7 | 33.5 | 31.5 | 29.6 | 15.7 | 8.4 | 4.4 | 2.4 |
| 20 | 82.4 | 77.5 | 72.9 | 68.6 | 64.5 | 60.6 | 57.0 | 53.5 | 50.3 | 47.2 | 25.1 | 13.4 | 7.1 | 3.8 |
| 10 | 175.2 | 164.9 | 155.1 | 145.8 | 137.1 | 128.9 | 121.2 | 113.9 | 107.0 | 100.6 | 53.7 | 27.6 | 15.1 | 8.0 |

TABLE 3

Voltage across two sense-ports of RUT v. parasitic resistance

| Voltage (mV) RUT (Ω) | Parasitic resistor (Ω) | | | | | | | | | | | | | |
|---|---|---|---|---|---|---|---|---|---|---|---|---|---|---|
| | 10 | 20 | 30 | 40 | 50 | 60 | 70 | 80 | 90 | 100 | 200 | 300 | 400 | 500 |
| 10000 | 707.9 | 707.3 | 706.7 | 706.1 | 705.5 | 704.8 | 704.2 | 703.6 | 703.0 | 702.4 | 696.4 | 690.5 | 684.7 | 678.9 |
| 9000 | 697.6 | 697.0 | 696.3 | 695.7 | 695.0 | 694.4 | 693.7 | 693.0 | 692.4 | 691.7 | 685.3 | 679.0 | 672.8 | 666.7 |
| 8000 | 684.7 | 684.0 | 683.3 | 682.6 | 681.9 | 681.2 | 680.5 | 679.8 | 679.1 | 678.4 | 671.5 | 664.7 | 658.1 | 651.5 |
| 7000 | 667.9 | 667.1 | 666.4 | 665.6 | 664.9 | 664.1 | 663.3 | 662.6 | 661.9 | 661.1 | 653.7 | 646.5 | 639.4 | 632.5 |
| 6000 | 645.0 | 644.2 | 643.4 | 642.6 | 641.8 | 641.0 | 640.2 | 639.4 | 638.6 | 637.8 | 630.0 | 622.4 | 614.9 | 607.5 |
| 5000 | 611.7 | 610.9 | 610.1 | 609.2 | 608.4 | 607.6 | 606.8 | 606.0 | 605.2 | 604.4 | 596.5 | 588.7 | 581.0 | 573.5 |
| 4000 | 558.7 | 557.9 | 557.2 | 556.5 | 555.8 | 555.1 | 554.4 | 553.6 | 552.9 | 552.2 | 545.1 | 538.0 | 530.9 | 523.9 |
| 3000 | 468.5 | 468.1 | 467.7 | 467.3 | 466.8 | 466.4 | 466.0 | 465.5 | 465.1 | 464.7 | 460.2 | 455.5 | 450.7 | 445.7 |
| 2000 | 334.0 | 333.9 | 333.7 | 333.6 | 333.4 | 333.2 | 333.1 | 332.9 | 332.7 | 332.6 | 330.8 | 329.0 | 327.0 | 325.0 |
| 1000 | 173.3 | 173.3 | 173.2 | 173.2 | 173.1 | 173.1 | 173.0 | 173.0 | 172.9 | 172.9 | 172.3 | 171.8 | 171.2 | 170.6 |
| 900 | 156.5 | 156.4 | 156.4 | 156.3 | 156.3 | 156.2 | 156.2 | 156.2 | 156.1 | 156.1 | 155.6 | 155.1 | 154.6 | 154.1 |
| 800 | 139.5 | 139.4 | 139.4 | 139.3 | 139.3 | 139.3 | 139.2 | 139.2 | 139.2 | 139.1 | 138.7 | 138.3 | 137.9 | 137.4 |
| 700 | 122.4 | 122.4 | 122.3 | 122.3 | 122.3 | 122.2 | 122.2 | 122.2 | 122.1 | 122.1 | 121.7 | 121.4 | 121.0 | 120.6 |
| 600 | 105.2 | 105.2 | 105.2 | 105.1 | 105.1 | 105.1 | 105.0 | 105.0 | 105.0 | 104.9 | 104.6 | 104.3 | 104.0 | 103.7 |
| 500 | 88.0 | 88.0 | 87.9 | 87.9 | 87.9 | 87.8 | 87.8 | 87.8 | 87.8 | 87.7 | 87.5 | 87.2 | 86.9 | 86.7 |
| 400 | 70.7 | 70.7 | 70.7 | 70.6 | 70.6 | 70.6 | 70.5 | 70.5 | 70.5 | 70.5 | 70.2 | 70.0 | 69.8 | 69.6 |
| 300 | 53.5 | 53.4 | 53.4 | 53.4 | 53.3 | 53.3 | 53.2 | 53.2 | 53.2 | 53.1 | 52.9 | 52.7 | 52.5 | 52.3 |
| 200 | 36.4 | 36.3 | 36.2 | 36.2 | 36.1 | 36.1 | 36.0 | 36.0 | 35.9 | 35.9 | 35.5 | 35.3 | 35.1 | 35.0 |
| 100 | 19.5 | 19.4 | 19.3 | 19.2 | 19.1 | 19.0 | 18.9 | 18.9 | 18.8 | 18.7 | 18.2 | 17.9 | 17.7 | 17.6 |
| 90 | 17.9 | 17.8 | 17.6 | 17.5 | 17.4 | 17.3 | 17.3 | 17.2 | 17.1 | 17.0 | 16.5 | 16.2 | 16.0 | 15.9 |
| 80 | 16.2 | 16.1 | 16.0 | 15.9 | 15.8 | 15.7 | 15.6 | 15.5 | 15.4 | 15.3 | 14.7 | 14.4 | 14.2 | 14.1 |
| 70 | 14.6 | 14.4 | 14.3 | 14.2 | 14.1 | 14.0 | 13.9 | 13.8 | 13.7 | 13.6 | 13.0 | 12.7 | 12.5 | 12.4 |
| 60 | 12.9 | 12.8 | 12.7 | 12.5 | 12.4 | 12.3 | 12.2 | 12.1 | 12.0 | 11.9 | 11.3 | 10.9 | 10.7 | 10.6 |
| 50 | 11.3 | 11.2 | 11.0 | 10.9 | 10.8 | 10.7 | 10.5 | 10.4 | 10.3 | 10.3 | 9.6 | 9.2 | 9.0 | 8.9 |
| 40 | 9.7 | 9.5 | 9.4 | 9.3 | 9.1 | 9.0 | 8.9 | 8.8 | 8.7 | 8.6 | 7.9 | 7.5 | 7.3 | 7.1 |
| 30 | 8.1 | 7.9 | 7.8 | 7.6 | 7.5 | 7.3 | 7.2 | 7.1 | 7.0 | 6.9 | 6.1 | 5.7 | 5.5 | 5.4 |
| 20 | 6.5 | 6.3 | 6.1 | 6.0 | 5.8 | 5.7 | 5.6 | 5.4 | 5.3 | 5.2 | 4.4 | 4.0 | 3.8 | 3.6 |
| 10 | 4.9 | 4.7 | 4.5 | 4.4 | 4.2 | 4.1 | 3.9 | 3.8 | 3.7 | 3.6 | 2.7 | 2.3 | 2.0 | 1.9 |

Capacitor Under Test (CUT)

The CUT test vehicle design is very similar to the RUT test vehicle design. A CUT test vehicle comprises multiple product layers which are used to form transistors for analog switch and pseudo-inverter, and one or more Customized Interconnect Layers (CILs) used to connect switches and pseudo-inverters into addressable pseudo-inverters units (APIUs) for capacitor measurement. The address signal is directly connected to each APIUs without decoder to minimize the routing complexity. APIUs comprise pseudo-inverters, and two PMOS gates.

The Probe Group (PG) is comprises probe pads, routing interconnect and Area-Of-Interest (AOI), where any of APIUs located in AOI will be connected to PG. The PGs are evenly placed across product chip. Thus, the product chip can be transformed into a test chip with millions of capacitor under test (CUT) cells.

Figure 9:
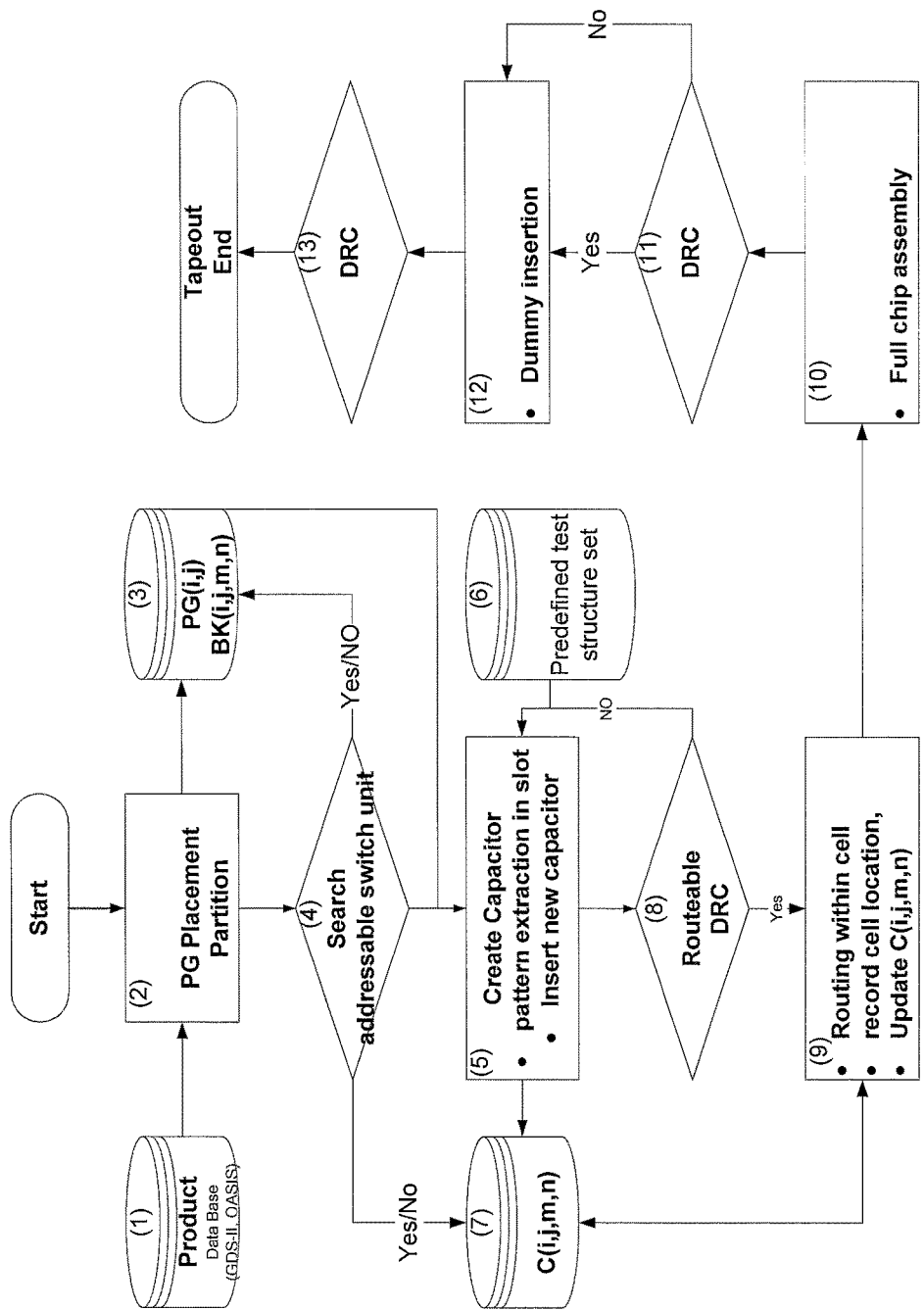
FIG. 9 illustrates a design flow of direct probing characterization vehicle (DPCV) for RUT and its application to improve process and yield.

FIG. 9 shows a process flow for the CUT characterization design suitable for a capacitor array. This process flow is almost identical to the process flow for resistor array as shown in FIG. 5.

The design of on-chip capacitor array starts from importing the product chip into database such as OpenAccess (OASIS) or GDSII as shown in step (1) of FIG. 9. By measuring chip size at X- and Y-direction, the full chip is evenly partitioned into rectangular areas called probe groups (PGs), similar to what is shown in FIG. 2. For each PG(i,j), it comprises probe pads for $CUT_m$, $GND_m$, $G_n$, $GREF_n$, $\phi N$, $\phi P$, and Powers (VDD/GND) and area for CUTs referred to as Blocks (BKm). The m-index for CUT/GND is from 0 to 13 and n-index for G/GREF is 0 to 6 as illustrated in FIG. 10. VDD is the voltage at probe pad of Nwell. GND is probe pad of p-substrate. BKm (m=0-13) is probe pad of are of interest. $\phi P$ is probe pad of PMOS at pseudo-inverter. $\phi N$ is probe pad of NMOS at pseudo-inverter. Gn/GREFn (n=1-6) is probe pads of analog switches. CUTm (m=0-13) is probe pads of current measured from capacitor.

(7). Routability check and design rule check are performed in FIG. 1(8). The result is updated to step (7) or will ask procedure in step (5) to provide a new CUT. The closed loop between steps (4) and (8) will end at the condition that it finds CUT is routable and DRC clean, or there is no CUT available in that slot. The later will flag C(i, j, m, n) as empty cell. A routing procedure in step (9) will take information from C(i, j, m, n) and perform interconnect routing to connect ForceHigh/SenseHigh/SenseLow to probe pads. A full chip assembly procedure in step (10) will take result from step (9) and place all CUTs into PG and assembly all PGs into full chip. DRC is performed again in step (11). This procedure will discover violations in full chip density and the boundary among PGs. Dummy insertion is performed in step (12) to fulfill manufacturing requirement such as multiple mask density balancing, CMP planarization and etc. DRC is performed again in step (13). This procedure will discover violations in full chip post dummy insertion and multiple masks balancing. Persons skilled in the art would recognize that some of the DRC and dummy insertion steps may be optional, depending on accuracy and manufacturing requirement.

To maximize CUT counts, the following optimization process is followed:

Assumption: either 1-ports or 2-ports per APIU.

Given N: total of probe pads and 4 pads for $\phi N$, $\phi P$, NW and GND.

To find G: total of Gate pads

For 1-port APIU: $\phi N$, $\phi P$, NW and GND are commonly shared within APIU block For 2-ports APIU: $\phi N$, $\phi P$, and NW are commonly shared within APIU block.

Schematic of various AASUs with resistor, as shown in FIG. 11(a)-(b).

| Schematic | VDD Gnd $\phi_P/\phi_N$ | Ports of CUT | Gate-lines per Cells | Maximum Cell counts | Constraints |
|---|---|---|---|---|---|
| FIG. 11(a) | 4 | 1 | 2 | $(N-4-G) \times G =$ $-2\left(G^2 - 2\times\frac{N-4}{4}\times G + \left(\frac{N-4}{4}\right)^2\right) + 2\times\left(\frac{N-4}{4}\right)^2 =$ $-2\left(G - \frac{N-4}{4}\right)^2 + 2\times\left(\frac{N-4}{4}\right)^2 \leq \frac{(N-4)^2}{8}$ | |
| FIG. 11(b) | 4 | 2 | 2 | $\frac{(N-4-2G)}{2} \times G =$ $-\left(G^2 - 2\times\frac{N-4}{4}\times G + \left(\frac{N-4}{4}\right)^2\right) + \left(\frac{N-4}{4}\right)^2 =$ $-\left(G - \frac{N-4}{4}\right)^2 + \left(\frac{N-4}{4}\right)^2 \leq \frac{(N-4)^2}{16}$ | $\frac{(N-4-2G)}{2}$ is integer |

PG placement and partition in step (2) will produce a PG location for placement PG(i,j) and CUT slot information BK(i, j, m, n) including location and slot size. Step (4) searches NMOS/PMOS to form APIU. Once APIU found, it is recorded into BK(i, j, m, n) and flagged as valid C(i, j, m, n). Target CUTs are selected from either the result of pattern extraction in step (5) or the predefined risky transistor failure pattern from the previous design as shown in step (6). CUT in each of BK(i, j, m, n) will stored in C(i, j, m, n) in step To maintain reliable capacitance measurement, total CUTs per block is limited by the following:

$$ILeak(i, j, m) = \sum_{p=0}^{G-1} ICell_{off}(i, j, m, p),$$

where all of APIU in m-Block are off-state.

$CUT_{design}(i,j,m,n)$: capacitance of $n^{th}$-CUT at $m^{th}$-block of PG(i,j).

$CUT_{REF}(i,j,m,n)$: dummy capacitance of $n^{th}$-CUT at $m^{th}$-block of PG(i,j).

ICUT(i,j,m,n): current through $n^{th}$-CUT at $m^t$-block of PG(i,j).

$ICUT_{REF}(i,j,m,n)$: current through $n^{th}$-CUTREF at $\phi$-block of PG(i,j).

SN: Signal to noise ratio.

SD: Signal to dummy ratio.

f: frequency of two synchronized non-overlap square-wave signals.

VCC: voltage of power supply $Accuracy_{min}$: accuracy requirement, for said, 1% is used in the optimization.

$$\frac{ICUT(i,j,m,n)}{ILeak(i,j,m)} \geq SN \ \& \ \frac{ICUT_{REF}(i,j,m,n)}{ILeak(i,j,m)} \geq SN$$

$$\frac{ICUT(i,j,m,n) - ICUT_{REF}(i,j,m,n)}{ICUT_{REF}(i,j,m,n)} \geq SD$$

$$ICUT(i,j,m,n) = (CUT_{design}(i,j,m,n) + CUT_{REF}(i,j,m,n) + C_{mismatch}(i,j,m,n)) * V_{CC} * f$$

$$ICUT_{REF}(i,j,m,n) = CUT_{REF}(i,j,m,n) * V_{CC} * f$$

$$\frac{ICUT(i,j,m,n) - ICUT_{REF}(i,j,m,n) - CUT_{design}(i,j,m,n) * V_{CC} * f}{CUT_{design}(i,j,m,n) * V_{CC} * f} \geq Accuracy_{min}$$

$$\frac{C_{mismatch}(i,j,m,n)}{C(i,j,m,n)} \geq Accuracy_{min}$$

Given the constraints of the equations above for CUT design, NMOS/PMOS transistor used in pseudo inverter, CUT's capacitance range, and parasitic capacitance of APIU, the accuracy will be obtained by running HSPICE simulation. Table 5 shows the accuracy (error) of CUT capacitance versus parasitic capacitance.

TABLE 5

Measurement accuracy of CUT

| $CUT_{design}$ | $C_{measured}$ calculated from ICUT and $ICUT_{REF}$ | $CUT_{REF}$ | $CUT-CUT_{REF}$ | Error |
|---|---|---|---|---|
| 1.00E−14 | 1.20E−14 | 2.02E−15 | 9.93E−15 | −0.70% |
| 2.00E−14 | 2.19E−14 | 2.02E−15 | 1.99E−14 | −0.51% |
| 5.00E−14 | 5.19E−14 | 2.03E−15 | 4.99E−14 | −0.27% |
| 1.00E−13 | 1.02E−13 | 2.03E−15 | 9.95E−14 | −0.51% |
| 2.00E−13 | 2.02E−13 | 2.03E−15 | 2.00E−13 | −0.19% |
| 5.00E−13 | 5.01E−13 | 2.03E−15 | 4.99E−13 | −0.21% |

Figure 11:
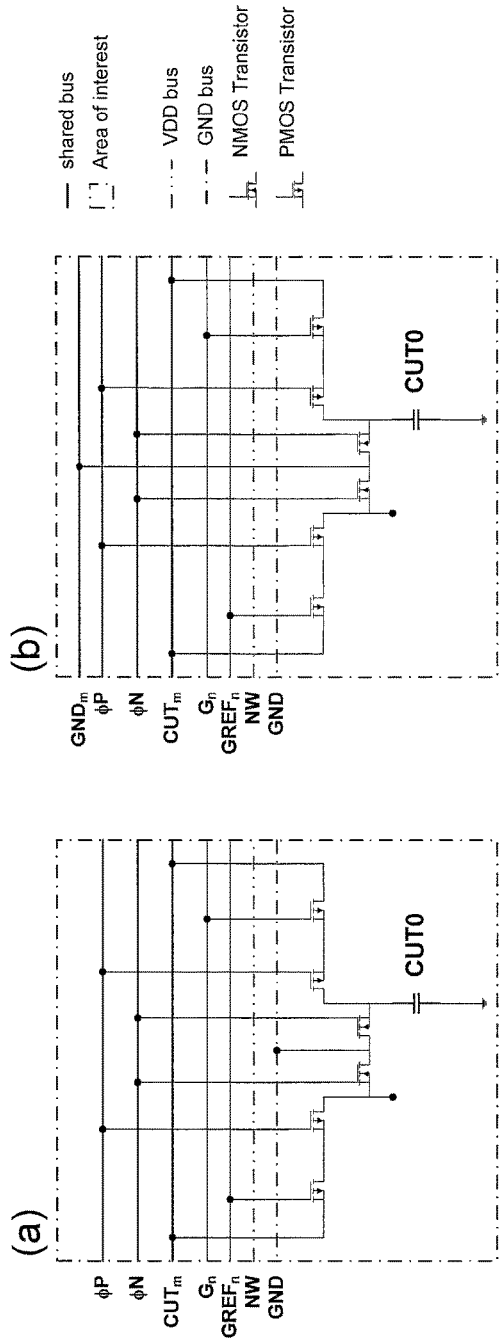
FIG. 11 illustrates schematic of various APIUs with capacitors.
Figure 12:
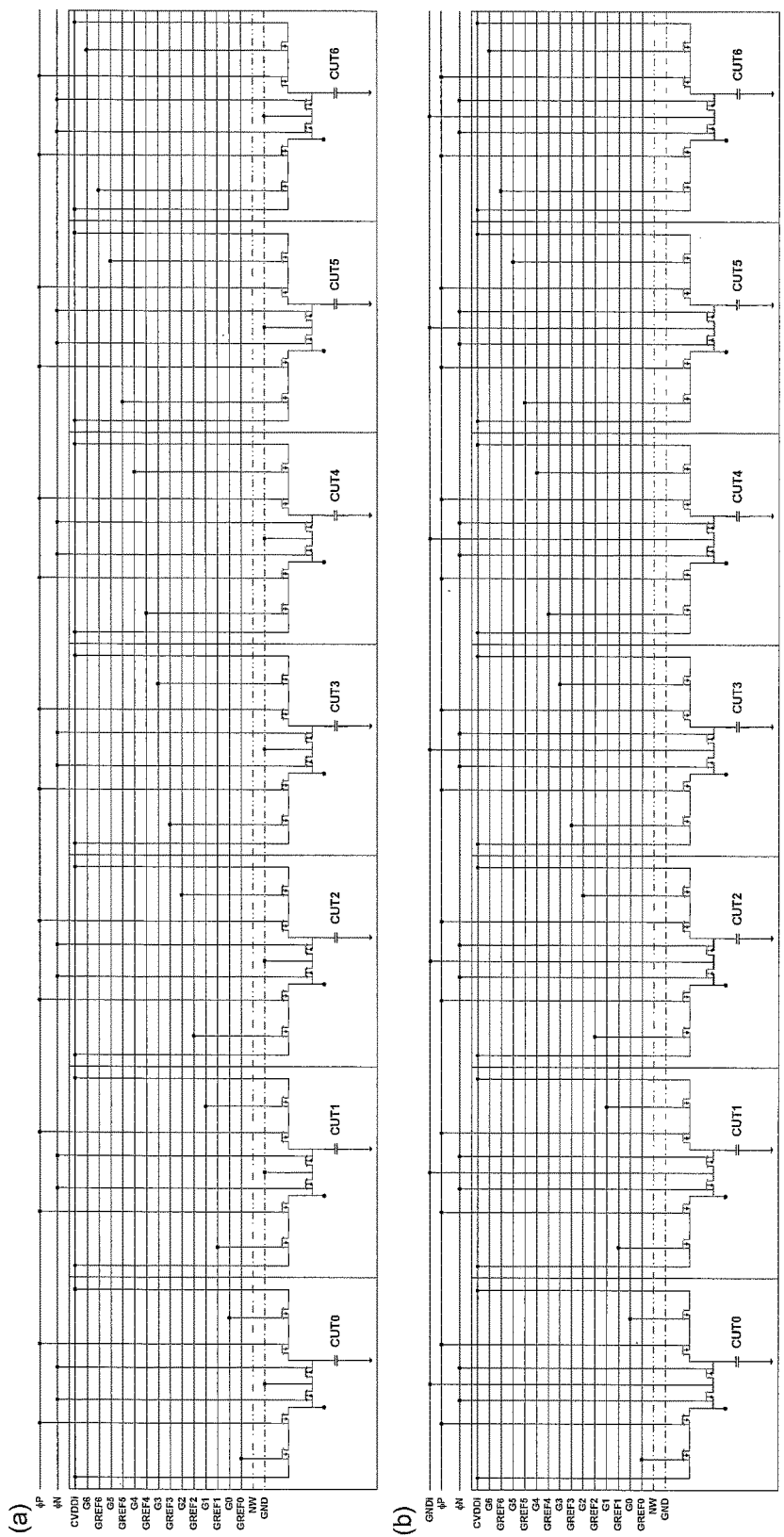
FIG. 12 illustrates floor plan and schematic of CUT inside an area of interest.
Figure 13:
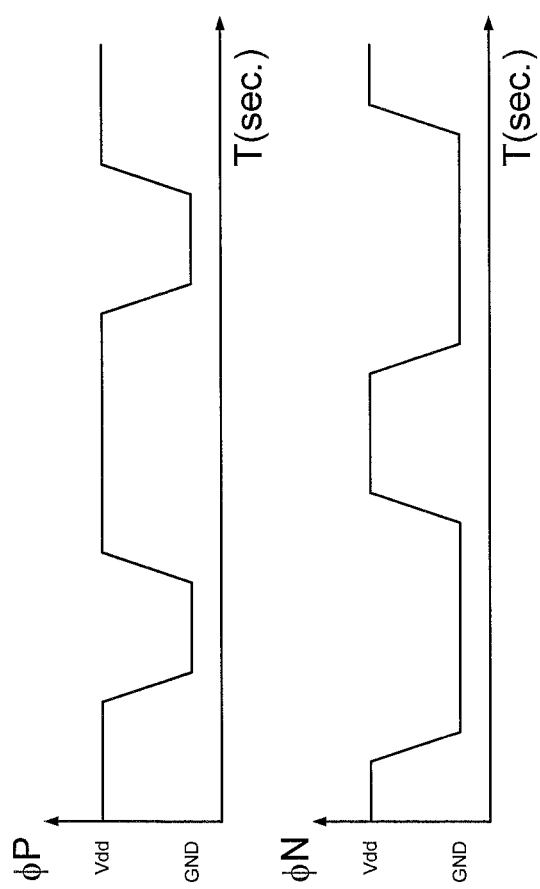
FIG. 13 illustrates timing diagram of non-overlap signal for $\Phi N$ and $\Phi P$.

FIG. 11 shows various units with capacitors. FIG. 11(a) shows 1-port ($CUT_m$) per capacitor; and FIG. 11(b) shows 2-ports ($CUT_m/GND_m$) per capacitor. FIG. 12 shows schematic of capacitors under test inside an area of interest. FIG. 13 shows the timing diagram of non-overlap signal for $\phi P$ and $\phi N$.

Voltage setting for all pins as listed in Table 6. Block leakage can be measured by turn off all APIUs. Within blocks, CUT is tested in sequence. Across block and PGs, testing can be performed in parallel.

TABLE 6

Voltage Setting of Probe Pads for Various Test Modes

| Test Mode | Block Leak ILeak (i, j, m) | C0 | | C1 | | C2 | | C3 | | C4 | | C5 | | C6 | |
|---|---|---|---|---|---|---|---|---|---|---|---|---|---|---|---|
| | m = 0 ~ 13 | $C_{Ref}$ | $C_{DUT}$ | $C_{Ref}$ | $C_{DUT}$ | $C_{Ref}$ | $C_{DUT}$ | $C_{Ref}$ | $C_{DUT}$ | $C_{Ref}$ | $C_{DUT}$ | $C_{Ref}$ | $C_{DUT}$ | $C_{Ref}$ | $C_{DUT}$ |
| CVDD0 | $V_{CUT}$ I(CV000) | | | | | | | $V_{CUT}$ I(CVDD0) | | | | | | | |
| CVDD1 | $V_{CUT}$ I(CVDD1) | | | | | | | $V_{CUT}$ I(CVDD1) | | | | | | | |
| CVDD2 | $V_{CUT}$ I(CVDD2) | | | | | | | $V_{CUT}$ I(CVDD2) | | | | | | | |
| CVDD3 | $V_{CUT}$ I(CVDD3) | | | | | | | $V_{CUT}$ I(CVDD3) | | | | | | | |
| CVDD4 | $V_{CUT}$ I(CVDD4) | | | | | | | $V_{CUT}$ I(CVDD4) | | | | | | | |
| CVDD5 | $V_{CUT}$ I(CVDD5) | | | | | | | $V_{CUT}$ I(CVDD5) | | | | | | | |
| CVDD6 | $V_{CUT}$ I(CVDD6) | | | | | | | $V_{CUT}$ I(CVDD6) | | | | | | | |
| CVDD7 | $V_{CUT}$ I(CVDD7) | | | | | | | $V_{CUT}$ I(CVDD7) | | | | | | | |
| CVDD8 | $V_{CUT}$ I(CVDD8) | | | | | | | $V_{CUT}$ I(CVDD8) | | | | | | | |
| CVDD9 | $V_{CUT}$ I(CVDD9) | | | | | | | $V_{CUT}$ I(CVDD9) | | | | | | | |
| CVDD10 | $V_{CUT}$ I(CVDD10) | | | | | | | $V_{CUT}$ I(CVDD10) | | | | | | | |
| CVDD11 | $V_{CUT}$ I(CVDD11) | | | | | | | $V_{CUT}$ I(CVDD11) | | | | | | | |

TABLE 6-continued

Voltage Setting of Probe Pads for Various Test Modes

| Test Mode | Block Leak ILeak (i, j, m) m = 0 ~ 13 | C0 | | C1 | | C2 | | C3 | | C4 | | C5 | | C6 | |
|---|---|---|---|---|---|---|---|---|---|---|---|---|---|---|---|
| | | $C_{Ref}$ | $C_{DUT}$ | $C_{Ref}$ | $C_{DUT}$ | $C_{Ref}$ | $C_{DUT}$ | $C_{Ref}$ | $C_{DUT}$ | $C_{Ref}$ | $C_{DUT}$ | $C_{Ref}$ | $C_{DUT}$ | $C_{Ref}$ | $C_{DUT}$ |
| CVDD12 | $V_{CUT}$ I(CVDD12) | | | | | | | $V_{CUT}$ | I(CVDD12) | | | | | | |
| CVDD13 | $V_{CUT}$ I(CVDD13) | | | | | | | $V_{CUT}$ | I(CVDD13) | | | | | | |
| G0 | Vdd | Vdd | 0 | Vdd | Vdd | Vdd | Vdd | Vdd | Vdd | Vdd | Vdd | Vdd | Vdd | Vdd | Vdd |
| GREF0 | Vdd | 0 | Vdd | Vdd | Vdd | Vdd | Vdd | Vdd | Vdd | Vdd | Vdd | Vdd | Vdd | Vdd | Vdd |
| G1 | Vdd | Vdd | Vdd | Vdd | 0 | Vdd | Vdd | Vdd | Vdd | Vdd | Vdd | Vdd | Vdd | Vdd | Vdd |
| GREF1 | Vdd | Vdd | Vdd | 0 | Vdd | Vdd | Vdd | Vdd | Vdd | Vdd | Vdd | Vdd | Vdd | Vdd | Vdd |
| G2 | Vdd | Vdd | Vdd | Vdd | Vdd | Vdd | 0 | Vdd | Vdd | Vdd | Vdd | Vdd | Vdd | Vdd | Vdd |
| GREF2 | Vdd | Vdd | Vdd | Vdd | Vdd | 0 | Vdd | Vdd | Vdd | Vdd | Vdd | Vdd | Vdd | Vdd | Vdd |
| G3 | Vdd | Vdd | Vdd | Vdd | Vdd | Vdd | Vdd | Vdd | 0 | Vdd | Vdd | Vdd | Vdd | Vdd | Vdd |
| GREF3 | Vdd | Vdd | Vdd | Vdd | Vdd | Vdd | Vdd | 0 | Vdd | Vdd | Vdd | Vdd | Vdd | Vdd | Vdd |
| G4 | Vdd | Vdd | Vdd | Vdd | Vdd | Vdd | Vdd | Vdd | Vdd | Vdd | 0 | Vdd | Vdd | Vdd | Vdd |
| GREF4 | Vdd | Vdd | Vdd | Vdd | Vdd | Vdd | Vdd | Vdd | Vdd | 0 | Vdd | Vdd | Vdd | Vdd | Vdd |
| G5 | Vdd | Vdd | Vdd | Vdd | Vdd | Vdd | Vdd | Vdd | Vdd | Vdd | Vdd | Vdd | 0 | Vdd | Vdd |
| GREF5 | Vdd | Vdd | Vdd | Vdd | Vdd | Vdd | Vdd | Vdd | Vdd | Vdd | Vdd | 0 | Vdd | Vdd | Vdd |
| G6 | Vdd | Vdd | Vdd | Vdd | Vdd | Vdd | Vdd | Vdd | Vdd | Vdd | Vdd | Vdd | Vdd | Vdd | 0 |
| GREF6 | Vdd | Vdd | Vdd | Vdd | Vdd | Vdd | Vdd | Vdd | Vdd | Vdd | Vdd | Vdd | Vdd | 0 | Vdd |
| NW | Vdd | Vdd | Vdd | Vdd | Vdd | Vdd | Vdd | Vdd | Vdd | Vdd | Vdd | Vdd | Vdd | Vdd | Vdd |
| GND | 0 | 0 | 0 | 0 | 0 | 0 | 0 | 0 | 0 | 0 | 0 | 0 | 0 | 0 | 0 |

The advantages listed for the TUT and RUT are also applicable for CUT, such as:

Turn product design into capacitor array test chip by reusing all FEOL/MOL product design layers and one or more interconnect customized design layer to connect transistors in product chip to probe pads.

Direct access to each of CUTs for capacitance measurement.

Capacitor selection from the result of: Pattern extraction inside area-of-interest to select transistor set to represent all transistor layout style in product chip; or, predefined failure/risky pattern which are learned from legacy technology or previous design.

All of CUTs in this test chip are within the same FEOL/MOL pattern density.

The invention has been described in terms of particular embodiments. Other embodiments are within the scope of the following claims. For example, the steps of the invention can be performed in a different order and still achieve desirable results. While certain representative embodiments and details have been shown for purposes of illustrating the invention, it will be apparent to those skilled in the art that various changes in the methods and apparatus disclosed herein may be made without departing from the scope of the invention which is defined in the appended claims.

The invention claimed is:

1. A method for testing an integrated circuit (IC) product, the method comprising:
    importing an original full-chip layout of a real IC product;
    partitioning the original full-chip layout into a plurality of probe groups, each probe group comprising a plurality of probe pads, and, a plurality of IC devices within an area of interest (AOI) having original routing interconnect for those IC devices;
    selecting a set of IC devices within the AOI using pattern extraction;
    for the selected set of IC devices, using pattern extraction to remove the original routing interconnect, and create customized interconnect layers (CIL) to reconfigure connection between the individual IC devices;
    incorporating the selected set of IC devices with the CIL into the original full-chip layout to create a modified full-chip layout such that a wafer fabricated using the modified full-chip layout comprises a real product with a built-in test vehicle; and
    testing the fabricated wafer utilizing one or more of the plurality of probe pads with the built-in test vehicle having the CIL and the selected set of IC devices, wherein the one or more of the plurality of probe pads are coupled to at least one of the selected set of IC devices in the fabricated wafer via the CIL.

2. The method of claim 1, wherein the set of IC devices with the CIL collectively works as an addressable analog switch unit (AASU).

3. The method of claim 2, wherein the AASU comprises an addressable pseudo-inverter unit (APIU) that is used to measure capacitance of a capacitor under test (CUT).

4. The method of claim 3, wherein the CUT is part of a capacitor-array-type test vehicle.

5. The method of claim 2, wherein the AASU is used to measure a resistance of a resistor under test (RUT).

6. The method of claim 5, wherein the RUT is part of a resistor-array-type test vehicle.

7. The method of claim 2, wherein an address signal is directly connected to the AASU through a probe pad without a decoder, thereby minimizing routing complexity.

8. The method of claim 1, wherein the set of IC devices with the CIL collectively works as an inverter for a resistor array-type test vehicle or a capacitor-array-type test vehicle.

9. The method of claim 1, wherein the set of IC devices includes one or more transistor under test (TUT).

10. The method of claim 9, wherein each TUT's gate is connected to a probe pad, thereby creating a self-gate-multiplexing direct probing characterization test vehicle.

11. The method of claim 10, wherein respective drains, sources and substrates of each TUT are commonly connected.

12. The method of claim 1, wherein the probe groups are spatially evenly distributed across the layout of the real IC product.

13. The method of claim 1, wherein the modified full-chip layout complies with a Design Rule Check (DRC) process.

14. The method of claim 13, wherein DRC substantially maintains a uniform full chip density across the modified full-chip layout including detecting violations at probe group boundaries.

15. The method of claim 14, wherein a dummy insertion process is performed before tapeout to comply with manufacturing requirement.

* * * * *